United States Patent [19]
Hofert et al.

[11] Patent Number: 5,337,233
[45] Date of Patent: Aug. 9, 1994

[54] METHOD AND APPARATUS FOR MAPPING MULTIPLE-BYTE CHARACTERS TO UNIQUE STRINGS OF ASCII CHARACTERS FOR USE IN TEXT RETRIEVAL

[75] Inventors: David K. Hofert, Hudson, N.H.; Yutaka Yoshida, Tokyo, Japan

[73] Assignee: Sun Microsystems, Inc., Mountain View, Calif.

[21] Appl. No.: 867,852

[22] Filed: Apr. 13, 1992

[51] Int. Cl.$^5$ ............................................. G06F 15/38
[52] U.S. Cl. ......................... 364/419.140; 364/419.1; 364/419.19
[58] Field of Search ............... 364/419, 514, 419.15, 364/419.09, 419.14, 419.16, 419.01, 419.03, 419.1, 419.19

[56] References Cited

U.S. PATENT DOCUMENTS

| | | | |
|---|---|---|---|
| 4,761,761 | 8/1988 | Sekiguchi | 364/419.15 |
| 5,050,121 | 9/1991 | Vaughan | 364/419.09 |

OTHER PUBLICATIONS

Xerox Network Systems Architecture General Information Manual, Apr. 1985, pp. 57–63.
UNIX System V Release 4, Multi-National Language Supplement, Product Overview, Chapt. 3, pp. 3–1 to 3–20.
Japanese Industrial Standard, Code of the Japanese Graphic Character Set for Information Exchange Kanji Code Table, Hideo Igusa.
Software Product Description, Fulcrum Ful/Text Version 5.0, pp. 1–10.

*Primary Examiner*—Robert A. Weinhardt
*Attorney, Agent, or Firm*—Erwin J. Basinski

[57] ABSTRACT

An apparatus and method for converting a non-English language document text or search and retrieval argument into a form which can be processed by an existing ASCII based automated text processing system, even though the non-English language may have thousands of characters in it, thereby allowing the use of existing text processing systems and existing text data bases without the need to convert these text processing systems to handle multi-byte character languages.

13 Claims, 5 Drawing Sheets

Figure 1

| #   | 10<br>JIS | 20<br>EUC | 30<br>S-JIS |
|-----|------|------|------|
| 1.  | 2421 | a4a1 | 829f |
| 2.  | 2422 | a4a2 | 82a0 |
| 3.  | 2423 | a4a3 | 82a1 |
| 4.  | 2424 | a4a4 | 82a2 |
| 5.  | 2425 | a4a5 | 82a3 |
| 6.  | 2426 | a4a6 | 82a4 |
| 7.  | 2427 | a4a7 | 82a5 |
| 8.  | 2428 | a4a8 | 82a6 |
| 9.  | 2429 | a4a9 | 82a7 |
| 10. | 242a | a4aa | 82a8 |
| 11. | 242b | a4ab | 82a9 |
| 12. | 242c | a4ac | 82aa |
| 13. | 242d | a4ad | 82ab |
| 14. | 242e | a4ae | 82ac |
| 15. | 242f | a4af | 82ad |
| 16. | 2430 | a4b0 | 82ae |
| 17. | 2431 | a4b1 | 82b0 |

PRIOR ART

Japanese Character Codes

Figure 2

ENGLISH

62 WORD ⟶ 1 (one)

64 HEX ⟶ 31

65 ASCII STRING ⟶ "31"

66 ASCII NUMBERS ⟶ 063 061

JAPANESE

74 WORD ⟶ 1 (ichi)

76 HEX ⟶ b0ec

77 ASCII STRING ⟶ "b0ec"

78 ASCII NUMBERS ⟶ 142 060 145 143

PRIOR ART

METHOD AND APPARATUS FOR MAPPING MULTIPLE-BYTE CHARACTERS TO UNIQUE STRINGS OF ASCII CHARACTERS FOR USE IN TEXT RETRIEVAL

BACKGROUND OF THE INVENTION

A portion of the disclosure of this patent document contains material is subject to copyright protection. The copyright owner has no objection to the facsimile reproduction by anyone of the patent document or the patent disclosure, as it appears in the Patent and Trademark Office patent file or records, but otherwise reserves all copyright rights whatsoever, most especially as they relate to the disclosed computer programs, listings, or descriptions.

1. Field of the Invention

The present invention relates to the field of Computer Systems using techniques for text storage and retrieval. More particularly, it relates to the use of techniques for the storage and retrieval of non-English language texts for use with systems which are designed around the English alphabet.

2. Background

Document retrieval systems, or automated text processor systems are a major application in many computer systems today. These are systems where various kinds of text are stored in some form of the computer memo or storage space, and can be efficiently accessed by the user and rapidly retrieved from the memo or storage.

One type of such storage space which is being used by many computer systems today is the Compact Disc-Read Only Memo (CD-ROM). CD-ROMs are disk files which can contain millions of characters of data on a single disk.

One type of software system used to read such CD-ROMs and retrieve data from that type of data base is the system called AnswerBook ™ developed by Sun Microsystems, Inc. (AnswerBook is a trademark of Sun Microsystems, Inc.). AnswerBook, like other such systems, provides the ability to do full-text searching (sometimes called "content-based retrieval") of over 16,000 pages of documentation. Such searching allows the user to enter a word or phrase or sentence (that is, a string of characters) and ask the text retrieval system to search the text stored for any instances of the word or character string entered, and to rapidly display those instances.

When documents are stored on CD-ROMs or other storage devices, they are typically stored as text characters which are encoded in the American Standard Code for Information Interchange (ASCII) 8-bit format. Since the English alphabet only contains 26 characters, and since that number plus the usual punctuation and special characters total less than 256 different characters, the binary representation of those characters will fit in one 8 bit byte of computer data ($2^8=256$).

Some non-English languages have many more than 256 characters in their language; for example, the Japanese language requires a character set of over 8,000 characters. Since this number cannot be accommodated within the range of an 8-bit (1 byte) number, multiple-byte characters must be used to describe the Japanese character set for computers. As a result, since most automated text processing systems cannot display or access a multi-byte text file, the use of existing automated text processing systems and available CD-ROM text data bases have not been available for Japanese or other languages with more than 256 characters in their alphabet.

While much progress is being made to standardize code sets for the languages of the world and to develop computer applications to use these universal code sets, it is generally necessary to rewrite the English language based applications programs themselves in order to use the programs with another language such as Japanese. The cost of such rewrites in many instances is prohibitive. The present invention makes use of an alternative scheme for using existing search and retrieval programs without the necessity of rewriting them by a novel technique of converting the non-English character code sets into ASCII format.

The International Standards Organization (ISO) has adopted various standard coding schemes to handle different languages and revises these from time to time to add more languages. As early as April 1984, Xerox Corporation published its own character code standard which included code assignments for Greek, Cyrillic, and Japanese characters in addition to the Latin character set defined by ISO 646. (For more information on the early Xerox standard see "Xerox Network Systems Architecture, General Information Manual" XNSG 068504, April 1984, pp. 57–61.). Subsequently, various Japanese Industrial Standard (JIS) Code sets were defined and similar standard codes were defined by AT&T called the "Extended Unix Code (EUC)" which conformed to ISO Standard 2022. More recently, the Open Systems Foundation, Unix International and Unix Systems Laboratories Pacific have agreed to support the Extended Unix Code (EUC) for Japanese language, enhancing prospects for portability and interoperability of computer applications. This common definition (EUC) includes support for Japanese standard code sets established in 1990, JIS X0212 Supplemental Kanji, JIS X0208 Kanji, and JIS X0201 One-byte Kana. These are described in the Standard publications titled the "Code of the Japanese Graphic Character Set for Information Exchange". (UNIX® is a registered trademark of UNIX System Laboratories, Inc.)

While these standard code definitions for Japanese characters, which define the characters in terms of multiple bytes of coded information, are a problem for applications designed to handle single byte coded input information, the written Japanese language poses many other complex issues for a text parser. Two significant problems which must be resolved in order to permit full-text searching of Japanese language text are 1) the problem of how to separate words in the text (there is no delimiter for words such as white spaces in English text); and 2) the problem of compound nouns that must be broken up for improved searching. The present invention also provides a way to handle these problems within the context of an ASCII based text processing system. No methods for solving such problems to permit the use of existing English based text retrieval applications with non-English complex languages are known in the prior art.

SUMMARY OF THE INVENTION

It is therefore an object of the present invention to prepare language text to be used by an existing text processing system, where the language comprises more than 256 characters, such as, Chinese, Japanese and many others.

It is a further object of the present invention to prepare language text to be used by a text processing system as a search argument to search a data base of such language text.

It is another object of the present invention to prepare Japanese language text for use in existing ASCII based text processing systems.

Under the present invention, these and other objects are achieved by a method and apparatus for preparing a language text to be used by an existing text processing system, where the language comprises more than 256 characters. This is done by capturing an input stream of characters which represent the given language, separating this input stream of characters into word groups, mapping these word groups into unique strings of single byte characters which can be passed to the selected text processing system for further processing.

The present invention provides the ability to use the grammatical rules of the selected language to identify word groups, and further provides a mechanism for separating compound words into their constituent simple word parts.

For the particular case where the language is Japanese, the preferred embodiment prepares the Japanese text for processing by an existing text processor system by encoding the Japanese characters using the extended UNIX code (EUC) which produces a stream of two byte hexadecimal characters. This stream of hexadecimal characters is then separated into words by first recognizing whether each character code belongs to either the Kanji, Katakana, or Hiragana character-set; and second by applying the general grammatical rule that nouns and other main words (which are Kanji or Katakana types) are normally followed by a preposition (Hiragana type). Compound words are broken up into their simple word parts by the use of a compound word look-up table. The hexadecimal character string is then mapped into a string of single byte ASCII characters for ultimate transfer to the text processing system.

DESCRIPTION OF THE DRAWINGS

The objects, features and advantages of the system of the present invention will be apparent from the following description in which:

FIG. 1 illustrates a portion of a current coding chart showing the relation of some ideograms to their JIS and EUC codes (prior art);

FIG. 2 illustrates the general mapping of an English word or Japanese (Romanji) word into hexadecimal ("hex") and from hex into ASCII;

NOTATIONS AND NOMENCLATURE

Figure 3:
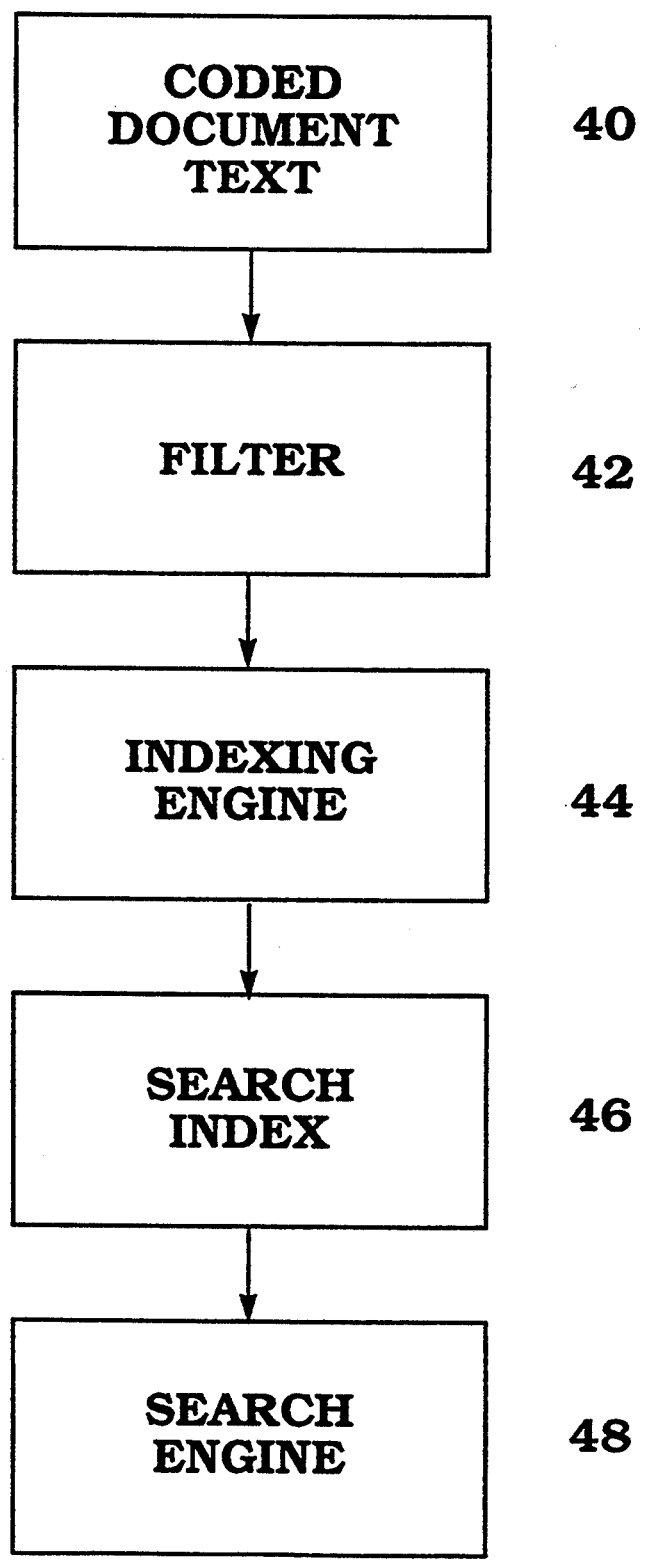
FIG. 3 is a block diagram of an existing ASCII input search and retrieval system (prior art)

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Definitions

IDEOGRAM-A character or symbol representing an idea or thing without expressing a particular word or phrase for it, as the characters in Japanese or Chinese.

ROMANJI-An alphabetical representation of phonetics of Japanese words or sentences.

HIRAGANA-One of three sets of Japanese characters that are primarily used to phonetically describe Japanese names and places. This character set is usually used for prepositions and word suffixes as well.

KATAKANA-(or KANA for short)-Another of the three sets of Japanese characters used primarily for phonetically spelling Western names and places.

KANJI-A form of Japanese ideograms used most often for nouns and the stems of verbs and adjectives. This is the largest set of the three Japanese character sets and is based on Chinese ideograms.

Description

The present invention is an apparatus and method for preparing a non-English type language, where the language has more than 256 characters, for use in existing text processing systems. This is accomplished by capturing a stream of characters representing the language, mapping the character strings into word groups (i.e. "words"), breaking up compound words into their elementary word parts, and mapping such words into unique strings of ASCII characters, for use with English-alphabet-based automated text processing systems. The invention thereby provides a practical method for using existing ASCII-based text search and retrieval systems with non-English languages, as for example, one which uses an ideogrammatic language such as Japanese, Chinese, etc.

In the present invention, the problem of using multi-byte characters in an ASCII (single byte) environment is solved through a simple but effective mapping technique. The Japanese ideograms have been enumerated (that is, one number for each individual ideogram) by various coding schemes, such as the ISO, JIS ,EUC, and others. The representative numbers can be coded into two 8-bit bytes or 16 bits. That is, the number (8000+) of Japanese ideograms is less than $2^{16}=65536$. These 2-byte numbers can by coded in hexadecimal ("hex") form since hex is a coding scheme with a base of 16. FIG. 1 shows a table which indicates three different coding schemes for the same Japanese ideogram ( the ideograms are not shown) for 17 different ideograms: the Japanese Industrial Standard JIS X0208-1990 (column 10), the S-JIS code (an alternative Japanese standard code set) ( column 30), and the Extended Unix Code (EUC) ( column 20). The entire code sets may be found in the official Standard publications. In the preferred embodiment of the present invention the codes shown in the column labeled "EUC" are used. This hex form allows the Japanese characters to be mapped from the two byte hex representation into a string of single byte ASCII representations. This technique works well for those languages, like Japanese for example, where the language's ideograms generally contain intrinsic meanings like English words. In the preferred embodiment, Japanese is mapped into English by mapping one Japanese ideogram in its EUC hex form (which will be two hex bytes represented by four alphanumeric characters) into a unique ASCII "word" string (which will be four ASCII bytes-one for each of the corresponding alphanumeric characters).

Referring now to FIG. 2, the mapping technique is generally illustrated. For example, in English, the number "one" is represented as the numeral "1" 62. The numeral "1" can be represented by the hex code "31" 64. Using the technique of the present invention which is more fully described below, this hex code "31" can be translated into an ASCII code string "31" 65 which is represented in the computer by the octal code "063 061" 66.

Similarly, in Japanese, the number "one" is represented in roman characters (Romanji) as "ichi" 74. Ichi can be represented in the EUC standard code by the hex code "b0ec" 76. Mapping the hex code "b0ec" 76 into the ASCII string "b0ec" 77 by means of the technique of the present invention results in a string of octal codes "142 060 145 143" 78. Therefore, just as the hex string "31" is a unique string of characters representing the numeral "1", so also the hex string "b0ec" is a unique string of characters representing the Japanese number one (ichi). Furthermore, since Japanese is ideogrammatic by nature, one given symbol can represent a complete idea or word. Therefore most Japanese symbols and the corresponding Romanji words can be represented by a string of four ASCII characters. This ability to map the unique hex string ("b0ec" in this example) into a unique string of ASCII characters ("b" "0" "e" "c") is the device which permits the use of existing ASCII based text retrieval systems by such non-English languages. It will be appreciated that while the preferred embodiment uses the Japanese language and the EUC code set, other code sets may be used similarly with Japanese or other languages.

The problem of separating words within a string of characters in a language such as Japanese would normally require a full natural-language parser for a complete solution. However, in general terms, Japanese sentences can be roughly broken up into words by identifying what "character-set" is used for each two byte representation. For example, the Kanji character set is used for most nouns, for stems of verbs, and some adjectives and adverbs. Hiragana is primarily used for prepositions, suffixes for the inflection/declension of a word, and some adjectives and adverbs. Katakana is used for foreign nouns.

Furthermore, in typical Japanese written sentences, a noun is accompanied by a preposition ("PP") to describe its "class" such as subject, object, time, place and so on. This structure looks something like the following: "NOUN+PP"+"NOUN+PP"+"NOUN+PP"+'-'VERB".

To illustrate how these characteristics are used to identify the individual words, consider the following example. A string of hex characters representing a line of Japanese text which is input to the storage and retrieval system might look like this: "bbe4a4cfb3aaa4c-8a5eda5d6a5b 9a5bfalb-ca4f2a4aaa4a4a4b7a4a4a4c8bb-d7a4a6"

Knowing that a Japanese ideogram character is two hex bytes, the string is parsed two bytes at a time and each two byte pair tested to determine whether it is Kanji, Katakana, or Hiragana. In the preferred embodiment this is easily done because the EUC coding scheme separates the character sets. That is, Hiragana words are coded "a4a0" through "a4f3", Katakana from "a5a0" through "a5f6" and Kanji from "b0a0" through "f4a4". As explained more fully below, this determination of which "character-set" the two-byte pair belongs to is done using the C-language functions of the SunOS ™ Japanese Language Environment (JLE). Continuing with the example, the entire stream of hex characters is initially mapped as follows:

| EUC code | Character Set | Word (Romanji) |
|---|---|---|
| bbe4 | - Kanji | - watasi |
| a4cf | - Hiragana | - ha |
| b3aa | - Kanji | - kani |
| a4c8 | - Hiragana | - to |
| a5eda5d6a5b9a5bfalbc | - Katakana(×5) | - robusutaa |
| a4f2a4aaa4a4a4b7a4a4a4c8 | - Hiragana (×6) | - wooisiito |
| bbd7a4a6 | - Katakana + Hiragana | - omou |

As each character-set change is identified, a space (hex "20") is inserted into the hex code stream as word separators. Then the "words" which are composed of multiple characters (compound words), such as "a5eda5d-6a5b9a5bfalbc" and "a4f2a4aaa4a4a4b7a4a4a4c8" and "bbd7a4a6" are further analyzed by comparing them to a "compound word" look-up table (LUT). If a compound word string is not found in the table it is treated as one word. In the above compound word strings, the set of Hiragana characters "a4f2a4aaa4a4a4b-7a4a4a4c8" would be found to correspond to

| a4f2 | - Hiragana | - wo |
| a4aaa4a4a4b7a4a4 | - Hiragana(×4) | - oisii |
| a4c8 | - Hiragana | - to | and a space (hex "20") would be inserted between each of them. Then this sentence translates roughly into English as follows:

watasi-I
ha-(preposition)
kani-a crab
to-and
robusutaa-a lobster
wo-(preposition)
oisii-be delicious
to-(preposition)
omou-think or generally, "I think that a crab and a lobster are delicious."

Therefore, in the preferred embodiment of the present invention, Japanese sentences are roughly broken up by recognizing these different character sets and inserting spaces between the words found by using the above charac-ter-set-mapping technique. There is some ambiguity for some words, but these words are not as symantically significant as are the nouns. In the case of Chinese, Vietnamese, or other ideogrammatic languages a similar word defining mapping technique can be imagined.

The compound word LUT mentioned above is further described as follows. Some Japanese words are composed of several ideograms that represent one idea or object thus forming compound words. An example in English text is the compound word "blackwalnuttree"

If this compound word were stored as one word, text searches for "tree", "black", or "walnut" would all fail to find this instance. For best results, the compound word should be separated into its component parts:

"black walnut tree".

In the preferred embodiment of the present invention, this problem is solved by the use of a look-up table (LUT) to recognize common compound word elements and split them apart as they pass into the index engine of the text storage and retrieval system. This would have the following effect in our scheme:

"a5a4b8c4a9b3b1d9c2e4c1b2"←"blackwalnuttree"

would be split into

"a5a4b8c4" "a9b3b1d9c2e4" "c1b2" ←"black walnut tree"

The LUT would contain these entries:
a5a4b8c4
a9b3b1d9c2e4
c1b2.

Generally, in most computer systems it is not commonly feasible to hold all combinations of compound nouns. However, it is usually possible to restrict the size of this table to include only the common compound words found in the particular application field such as computer equipment or maintenance manuals, medical papers, political fields, etc. In the preferred embodiment the dictionary is limited to 5 kbytes, holding only those 100 most common compound words found in the particular application. It will be understood by those skilled in the art that the size and makeup of this LUT can vary widely according to this concept.

In some search and retrieval applications using another language, it may be desirable to include in the non-English text some equivalent English words which have become "common" in the language through usage. Accordingly, in the presently preferred embodiment, a second look-up table (LUT) of "key English word equivalents" is scanned to find any such key English words and these are inserted into the hex stream adjacent to the Japanese hex word.

How to Use the Invention

The following describes the preferred embodiment of the present invention in more detail. With reference to FIG. 3, a typical prior art automated text processing system, such as for example, the AnswerBook product, contains a document processor and Search and Retrieval system which has two major elements: an Indexing Engine 44 and a Search Engine 48. The Indexing Engine 44 reads the ASCII files and processes the semantic information into a final format that can be stored or alternatively used by the Search Engine 48. The final output of the Indexing Engine 44 is called the "Search Index" 46. The Search Engine 48 is the element that uses a "pre-compiled" or pre-processed text data base and quickly finds matches to the search arguments entered by the user. In a typical ASCII based automated text processor system, the document text 40 is fed to a filter 42, whose job is to prepare the document text 40 for the Indexing Engine 44, which after processing, passes data to the Search Engine 48. The Indexing Engine 44 expects to see only characters that it recognizes (i.e. the text processor's internal character set) and some control characters that will identify certain characters as belonging to a defined class such as Titles, Headers (structural components), or just body text. Thus the job of the filter 42 is to convert ASCII text into the proper format that the Indexing Engine 44 can understand and to determine structural components within the input text and to discard any unnecessary formatting instructions. There is an inherent assumption that each word is separated by a separator character (space, newline, tab) which allows the Indexing Engine 44 to "realize" words from the character stream. Filters (such as filter 42) are normally written specifically to each format that will be required by the Indexing Engine 44.

Figure 4:
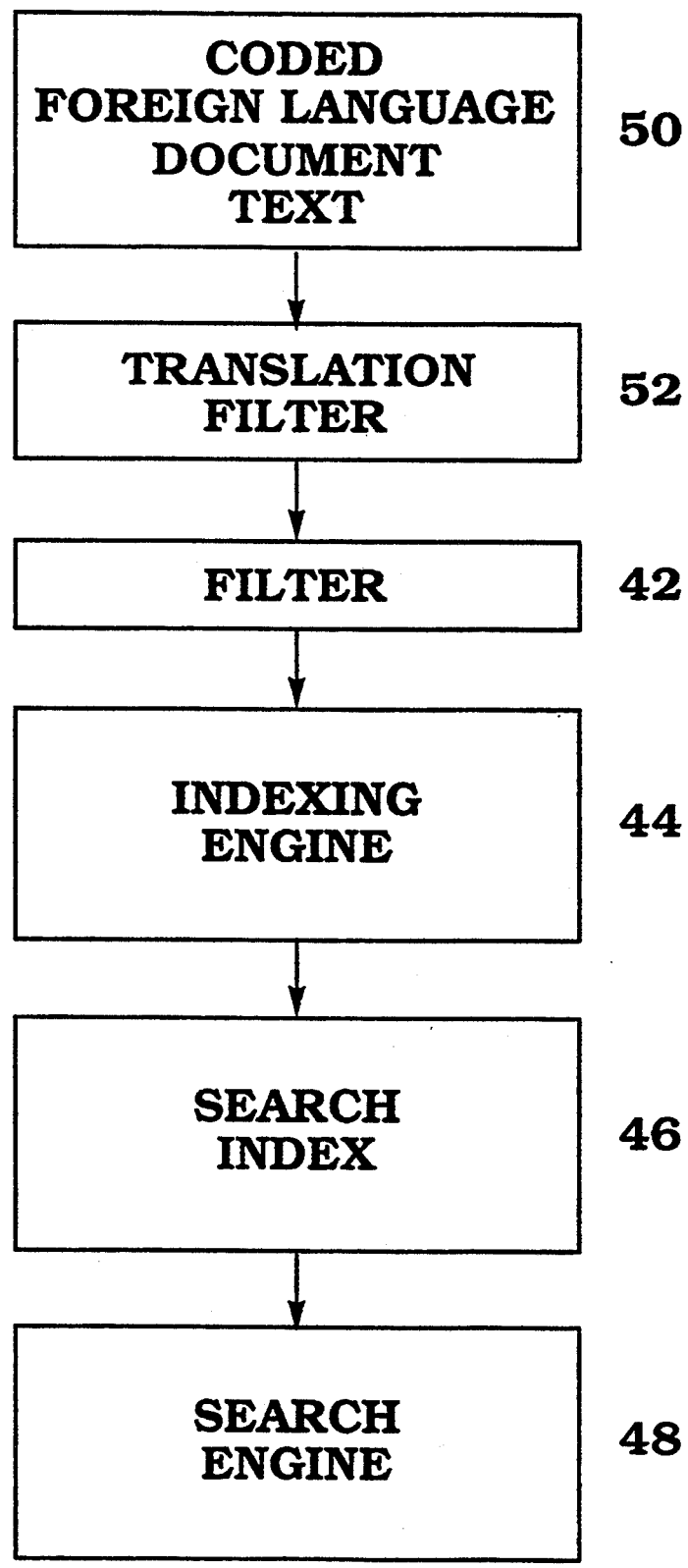
FIG. 4 is a diagram of a search and retrieval system showing the present invention.

Referring now to FIG. 4, in the preferred embodiment of the present invention, an additional filter (the "Translation Filter") 52 is added between the foreign language document text 50 (which in the case of Japanese is in EUC form) and the Index Engine filter 42 to convert the non-English language multi-byte characters into ASCII strings to be indexed. In the preferred embodiment, this Translation Filter 52 uses special "wide character" functions in order to process each character, English or not, as two bytes. The Translation Filter 52 determines the word boundaries, breaks up any compound words, and inserts any special English word equivalents into the Japanese character stream before finally mapping the hex stream into the ASCII stream, which is then passed to the "normal" filter 42.

Once the multi-byte characters have been converted from hex strings into ASCII by the Translation Filter 52, processing by the text processor proceeds normally (i.e. text storage or search and retrieval). That is, at that time, all structural information (such as Chapter, Title, etc.) is the same as for the English text so the normal Index Engine filters 42 can run without modification. However, if this structural information was converted to Japanese (or other language) characters, the index filters 42 would be modified to recognize them as structural data. For example, "a4a5c9c3d3a9" would be recognized rather than "ChapterTitle".

Figure 5:
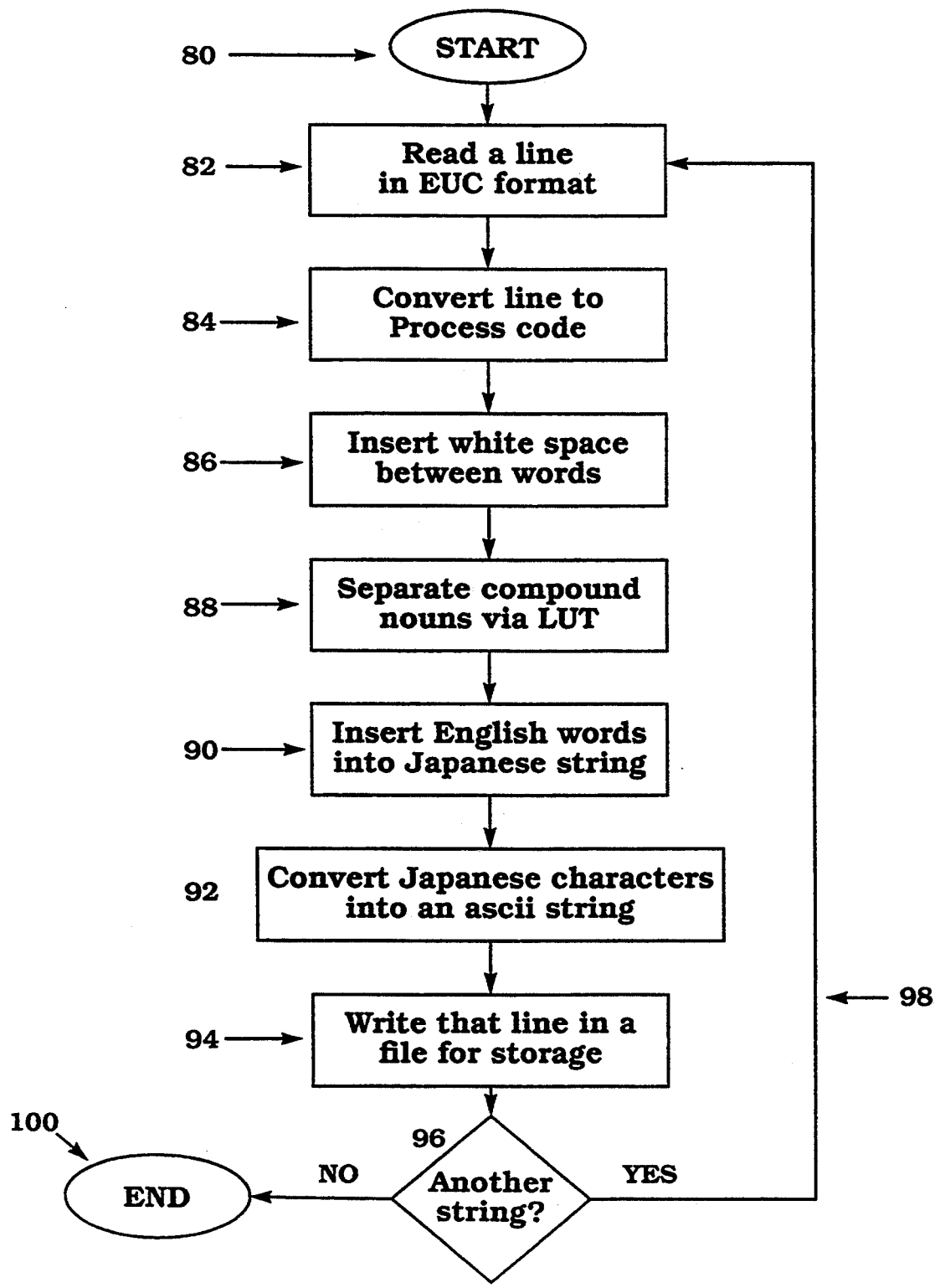
FIG. 5 is detailed diagram of the present invention.

This operation of the Translation Filter 52 is now more fully described by referring to FIG. 5. On entering the Translation Filter 52 a line of Japanese characters in EUC form is read 82. This line of characters is converted to "Process" code 84 which puts the data in a fixed length, two-byte form for easier handling by the Translation Filter 52 program. This is accomplished by using the C-language function "mbstowcs (s1,s2,n)" which performs the function "convert multi byte set to wide character set". This function converts the EUC string "s2" into the Process code string "s1". It stores no more than "n" elements in the array pointed to by "s1", stopping before that if it encounters a Null character. This is done to make sure that all characters are the same width. For example, English ASCII characters which use one byte, may be mixed with Kanji characters which use two bytes. This function "mbstowcs" assigns all characters to two bytes by padding the English character (and other characters that need it) with a 0 byte to make it two bytes wide. For example,

|  | Before Conversion | After Conversion |
|---|---|---|
| Japanese | b0ec | b0ec |
| English | 31 | 0031 |

From this converted string of code, a two-byte pair is processed to determine its character set (Kanji, Katakana, Hiragana, English, or digits) 86. This is done using the following C-language functions in the Japanese libraries of JLE:

iswalpha ( ) (determines if character is alphabetic or not)
isjhira ( ) (determines if character is hiragana or not)
isjkata ( ) (determines if character is katakana or not)
isjkanji ( ) (determines if character is kanji or not)

This process is repeated for the next two-byte pair and if the second set results in a different character-set, a white space (hex "20") is inserted between this one and the previous one. For example, if the first character-set result is "Kanji", and the next character-set result is "Katakana", a white space is inserted between the first and second two-byte code pairs. When the line of code is completed any compound words resulting from this process are tested against a compound-noun dictionary look-up table (LUT) 88 and any such compound nouns which are found in the LUT are replaced with their corresponding separate word parts and with the necessary white spaces to separate the individual words. The system then checks each word identified by the above process against a small English-Japanese dictionary of key words 90. If a key English word is found, it is inserted into the character stream, next to the equivalent Japanese word, with the appropriate white space separators. This string of the two byte wide characters is now converted into ASCII code representation 92 by use of the C-language function "wsprintf ( )" which is a function equivalent to the standard C-language function "sprintf ( )" except that it prints the "wide characters". This function does not actually "print" anything but rather prepares the characters for printing by converting them into ASCII characters. In the preferred embodiment of the present invention, this file of ASCII characters is used as the input to the applicable text retrieval Indexing Engine filter 42 (in FIG. 4). Using the example in FIG. 2 the conversion of the English and Japanese number "one" would proceed as follows:

|  | English | Japanese |
|---|---|---|
| number = | 1 | ichi |
| hex = | 31 | b0ec |
| wide characters = | 0031 | b0 ec |
| ASCII octal = | 000 000 063 061 | 142 060 145 143 . |

The line of ASCII code is written to a file 94 and the process repeated 96 until all lines of text have been processed and control is transferred to the normal filter (42 in FIG. 4) for processing by the ASCII based system.

In the preferred embodiment, this same filter procedure is used whether the Japanese text is being read for storage or certain Japanese words are input (as search arguments) for text retrieval. This allows a Japanese user to enter Japanese characters in Romanji into the search window of the computer display, which then are converted into the appropriate string and sent to the Search Engine. A program to convert the string back into Japanese characters is used to display the results of the search, which will be converted back into Japanese characters.

Some English text/hex-string overlaps such as the word "face" (English word "face" and Japanese EUC code value="face") may require tagging either the English or Japanese text to assist the hex-string-→Japanese conversion to know which is English. That is, any English word made up of the characters "a,b,c,-d,e,f,0–9" and within the ranges of the Japanese character-sets in EUC code, would be identical to a Japanese character. In the preferred embodiment, English words in Japanese sentences are marked with a double ampersand to prevent any such confusion. For example, the English word "face" would be marked "@@face@@"

It is noted that, in the preferred embodiment, the Translation Filter 52 (FIG. 4) and the normal Index Filter 42 exist along an implementation continuum—processes which occur in one today could occur in the other filter and vice versa. It is up to the implementor to choose the division of labor that best suits his or her needs, and one skilled in the art can envision various implementations of the methods disclosed above In the presently preferred embodiment, one additional method to extract information from compound nouns is used. Some search engines (such as the one used in AnswerBook, for example) allow a technique known as "wildcarding" on search queries. Wildcarding allows the insertion of special characters, such as "*" or "!" etc. to indicate that the search engine should select any instance where additional characters appear in or after the position of the special character. This sort of search will enable the engine to find a word that may be embedded in a compound noun that was not broken up via the LUT technique. For example, a search for: "a3a4b2b5*"
will find:
a3a4b2b5
a3a4b2b5d8e3
a3a4b2b5a4a2c9c0d0c2
and so on. While the present invention has been described in terms of a presently preferred embodiment, those skilled in the art will recognize that the invention is not limited to the embodiment described Methods for uniquely mapping the characters of other languages into hex characters and for parsing the character strings into words can easily be envisioned by one skilled in these arts. The method and apparatus of the present invention can be practiced with modification and alteration within the spirit and scope of the appended claims. The description is thus to be regarded as illustrative instead of limiting the scope of the present invention.

What is claimed is:

1. A method for preparing language text to be used by a text processing system, where said language comprises more than 256 characters, said method comprising the computer implemented steps of:
   a) capturing an input stream of characters which represent said language;
   b) separating said input stream of characters into strings of characters which represent words; said separation into words being accomplished by using rules of grammar of said language to determine where to insert word separators into said stream of characters to delimit groups of said characters which constitute words in said language, and whereby no special characters in said input stream of characters is required to distinguish one word or character set from another;
   c) mapping said character strings into unique sets of single byte ASCII characters; and
   d) transferring said unique sets of single byte ASCII characters which represent words to said text processing system for further processing.

2. The method described in claim 1 comprising the additional steps of:
   a) detecting whether said words in said language are compound words, a compound word being comprised of character strings of more than two bytes of character code;
   b) comparing a detected compound word to words stored in a look-up table of compound words, said look-up table comprising compound words as arguments of said look-up table and related component words of said arguments as function elements of each argument;
   c) designating said component word as a single word if said compound word is not found in said look-up table; and
   d) if said compound word is found in said look-up table, substituting component words contained in said look-up table which are related to said compound word in place of said compound word;
whereby a look-up table of compound words of said language is used to facilitate the separation of certain ones of said compound words into their respective simple word components in said character strings.

3. The method described in claim 2 wherein said language is Japanese.

4. The method described in claim 3 wherein said step of capturing said Japanese language into said input stream of characters is accomplished by the use of extended UNIX code ("EUC") which comprises a two byte hexadecimal code for each of said Japanese characters.

5. The method described in claim 4 wherein said step of inserting said word separators into said hexadecimal character strings comprises the following additional steps:
   a) determining whether each of said two byte hexadecimal codes belongs to a kanji, katakana or hiragana character-set;
   b) inserting one of said word separators between any two adjacent ones of said two byte hexadecimal codes which belong to different ones of said kanji, katakana or hiragana character-set codes;
   c) identifying a string of two or more of said two byte hexadecimal codes which are of the same one of said kanji, katakana or hiragana character-sets as a compound word; and
   d) comparing each of said compound words to entries in a compound word look-up table and if a match occurs, separating said compound word which matches into its constituent word parts as indicated by said look-up table and inserting one of said word separators between each of said word parts.

6. An apparatus for preparing language text to be used by a text processing system, where said language comprises more than 256 characters, said apparatus comprising:
   a) a filter device for capturing an input stream of characters which represent said language comprising;
      a word falter for separating said input stream of characters into strings of characters which represent words, wherein said word filter comprises a grammar analyzer to facilitate the separation of said characters into strings of said characters which represent words, wherein no special characters in said input stream of characters is required to distinguish one word or character set from another, and wherein character strings comprising more than two bytes of data art called compound words;
   b) a mapping device coupled to said word filter, for mapping said strings of characters which represent words into unique strings of single-byte ASCII characters; and
   c) an output device coupled to said mapping device, for passing said unique strings of single-byte ASCII characters which represent words to said text processor.

7. The apparatus in claim 6 wherein said language is Japanese.

8. The apparatus in claim 7 wherein said input stream of characters which represent said Japanese language used by said filter device employs extended UNIX code ("EUC") to represent said characters.

9. The apparatus in claim 8 wherein said word filter further comprises a separating mechanism for comparing each of said compound words with entries in a first look-up table, said first look-up table comprising compound words as arguments of said look-up table and related component words of said arguments as function elements of each argument; said separating mechanism designating said compound word as a single word if said compound word is not found in said first look-up table; and if said compound word is found in said first look-up table, said separating mechanism substituting component words contained in said first look-up table which are related to said compound word in place of said compound word.

10. The apparatus in claim 9 wherein said word filter further comprises an insertion device for inserting English words into said word groups of characters by using a second table look-up device for comparing each of said word groups of characters with entries in said second look-up table, said second look-up table comprising word groups of characters as arguments of said second look-up table and related English words as function elements of each argument: and if a word group of characters is found to match an argument in said second look-up table, said insertion device inserting any related English words found in said second look-up table into said word groups of characters representing said Japanese words.

11. The apparatus in claim 7 wherein said word filter comprises:
- a) a character-set analyzer for determining whether a code representing each of said Japanese characters belongs to a kanji, katakana, or hiragana character-set;
- b) a character insertion device coupled to said character-set analyzer, for inserting a word separator mark in said character code string whenever said character-set analyzer determines that said character-set has changed, said word separator mark comprising a unique character which is inserted into said character string between adjacent character code strings which represent character-sets which are different from each other;
- c) a word size analyzer device coupled to said character-set analyzer, for selecting a series of said Japanese characters as a compound word when said character-set analyzer determines that a character code string between two consecutive word separators comprises more than two bytes of data: and
- d) a word separating device coupled to said word size analyzer for separating said compound word into its constituent word parts and marking each of said constituent word parts as a separate word by attaching a word separator mark to each of said constituent word parts.

12. In a computer system comprising an ASCII based text processing system, a method for preparing language text to be used by said ASCII based text processing system, where said language comprise more than 256 characters, said method comprising the step of:
- a) translating said language text into hexadecimal character strings;
- b) mapping said hexadecimal character strings into unique sets of single byte ASCII characters;
- c) inserting word separators in said hexadecimal character strings to delimit groups of said hexadecimal characters which consitute words in said language wherein the rules of grammar or said language are used to determine where to insert said word separators into said hexadecimal character strings, and wherein no special character in said input stream of characters is required to distinguish one word or character set from another; and
- d) transferring said unique sets of single byte ASCII characters to said ASCII based text processing system for further processing.

13. The method described in claim 12 wherein a look-up table of compound words of said language is used to facilitate the separation of certain ones of said compound words into their respective simple word components in said hexadecimal character strings.

* * * * *